(No Model.)
W. D. SMITH.
FLOWER TRELLIS.
No. 510,523.   Patented Dec. 12, 1893.
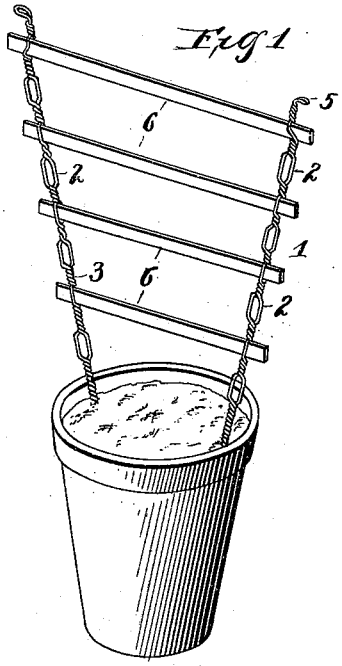
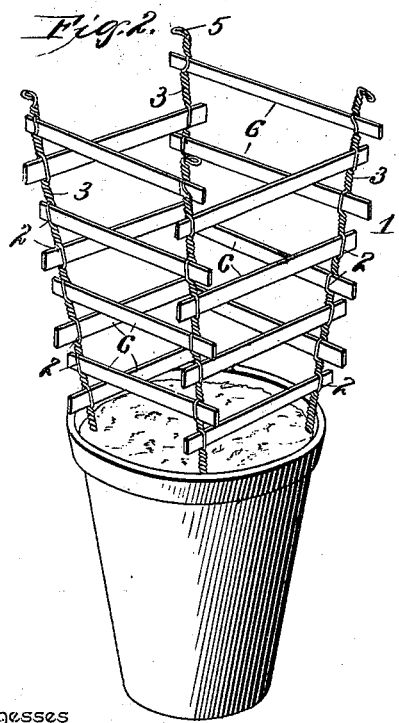
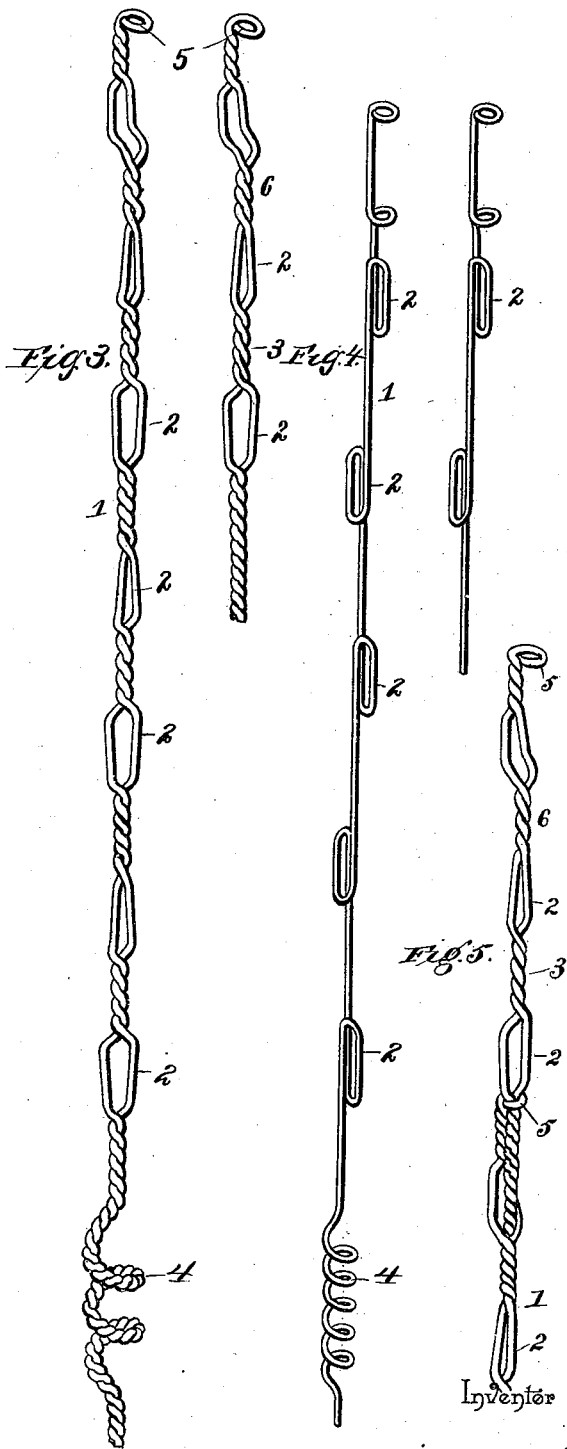
Witnesses  
E. C. Hurdeman  
Chas. S. Hyer  
By his Attorneys,
Inventor  
Walton D. Smith  
C. A. Snow & Co.

UNITED STATES PATENT OFFICE.

WALTON DUANE SMITH, OF PROPHETSTOWN, ILLINOIS.

FLOWER-TRELLIS.

SPECIFICATION forming part of Letters Patent No. 510,523, dated December 12, 1893.

Application filed April 30, 1892. Serial No. 431,279. (No model.)

*To all whom it may concern:*

Be it known that I, WALTON DUANE SMITH, a citizen of the United States, residing at Prophetstown, in the county of Whiteside and State of Illinois, have invented a new and useful Flower-Trellis, of which the following is a specification.

This invention relates to certain new and useful improvements in trellises for plants or vines, and consists of the construction and arrangement of parts as will be more fully hereinafter described and claimed.

The object of the invention is to provide a trellis of simple and light construction which is preferably constructed of wire bent into proper shape and adapted to be extended by additions in the form of accompanying attachments to any height desired, and wherein are employed wooden slats which obviate laceration of the delicate tendrils of a vine or parts of a plant which may be supported thereby.

In the drawings:—Figure 1 is a perspective view of the improved trellis shown in position in a flower pot and as arranged in its simplest form. Fig. 2 is a similar view showing the trellis with an increased number of slats therein, and as providing an inclosure. Fig. 3 is a similar view on an enlarged scale of one of the uprights and the extension attachment therefor disconnected therefrom and at one side thereof. Fig. 4 is a perspective view of a modified form of construction. Fig. 5 is a detail perspective view showing the extension in connection with the upper part of one of the uprights.

Similar numerals of reference are used to indicate corresponding parts in the several views.

Referring to the drawings, the numeral 1 designates the uprights, and each of the same consists preferably of a twisted wire which is of doubled form as shown in Figs. 1, 2, and 3, and wherein are formed a series of elongated loops 2 alternately arranged at right angles to each other and intersected as at 3 by twists which provide a rigid construction which is capable of sustaining a considerable amount of weight and to remain in an erect or upright position. The lower end of each upright is spirally twisted as at 4 and is adapted to be embedded in the ground, and the said spiral construction provides an increased bearing surface which will prevent easy displacement of the upright. The upper end of each upright is formed with an eye 5 and the loop 2 below and adjacent to the said eye is so bent and shaped as to be normally located in line with the said eye. This latter construction provides means for extending the uprights through the medium of extension attachments 6 which are in all respects similar in construction to the uprights heretofore set forth and have their lower ends removably fitted in the eyes 5 on the upper ends of the uprights and the loops below said eyes. The upper ends of the said extension attachments are constructed in the same manner as the upper ends of the uprights and by this means the trellis may be extended to any height desired.

By means of the elongated loops having an inherent resiliency imparted thereto by the uprights themselves as constructed, a frictional contact and biting action is produced upon the ends of the slats, and when the said slat-ends are inserted in the loops the latter spread apart a trifle and are therefore normally of less width than the ends of the slats which engage the same.

In Fig. 4 a modified form of construction is shown and consists in forming the uprights as well as the extension attachments of the same of a single strand of wire and the loops 2 in this instance are constructed by bending said wire backward and then returning the same as fully shown. The spiral arrangement of the lower end of the upright is preserved in this form of construction, and at the upper end of each upright and also the extension attachments, double eyes are provided to receive the lower ends of the extension attachments applied thereto and of the attachments to themselves. The loops in this form are also arranged at right angles as in the previous construction.

The loops 2 are for the purpose of receiving the ends of wooden slats 6 which may be cut of such length as to arrange the upright at any angle and provide either a single ladder trellis as shown by Fig. 1 or an angularly arranged inclosing trellis as shown by Fig. 2. This latter form of the trellis is readily obtained through the angular arrangement of the loops 2 as has been heretofore set forth, and may be changed into triangular or polygonal form as may be desired and which will result by the employment of a number of uprights arranged in the proper manner. The use of the wooden slats avoids injury to the plants or vines supported thereby by providing an easy bearing surface for the same.

The parts of the trellis are readily detached when it is desired to store or transport the same, and owing to the simplicity of the form of the same they are very compact when arranged in bulk. The trellis may be set up in gardens and extended as may be desired, either lengthwise or in height and is convenient for all purposes.

Having thus described the invention, what is claimed as new is—

1. In a flower trellis, the combination of an upright having elongated loops therein alternately arranged at angles to each other and its upper end provided with eyes, and removable extensions adapted to be fitted in said eyes, substantially as described.

2. In a flower trellis, the combination of uprights having loops therein alternately arranged at right angles to each other and eyes at the upper ends thereof adapted to receive the lower ends of similarly constructed extensions, and a series of slats connecting the parallel loops of adjacent uprights, substantially as described.

3. In a flower trellis, the combination of uprights formed of twisted wire and having elongated loops therein alternately arranged at right angles to each other, and slats having the ends thereof inserted in the said loops, the said slats being tightly held in position by the contraction of the said loops and binding of the same on the ends of the slats, as the said loops are normally of less width than the ends of the slats with which they engage and have an inherent elasticity or resiliency, thereby avoiding accidental disengagement, substantially as described.

In testimony that I claim the foregoing as my own I have hereto affixed my signature in the presence of two witnesses.

WALTON DUANE SMITH.

Witnesses:
C. J. WARNER,
JAMES SCARRITT.